United States Patent [19]

Buecheler

[11] 4,016,182
[45] Apr. 5, 1977

[54] PROCESS FOR THE PRODUCTION OF AMINOANTHRAQUINONE COMPOUNDS

[75] Inventor: Paul Buecheler, Reinach, Basel-Land, Switzerland

[73] Assignee: Sandoz Ltd., Basel, Switzerland

[22] Filed: May 22, 1974

[21] Appl. No.: 472,141

[30] Foreign Application Priority Data

May 28, 1973 Switzerland .................. 7639/73

[52] U.S. Cl. .................. 260/371; 260/372; 260/373; 260/374; 260/377; 260/380; 260/381

[51] Int. Cl.$^2$ .......................... C09B 1/22

[58] Field of Search ............. 260/378, 689, 563 D, 260/371, 372, 373, 374, 377, 380, 381

[56] References Cited

UNITED STATES PATENTS

| | | | |
|---|---|---|---|
| 2,309,708 | 2/1943 | Olpin et al. | 260/378 |
| 3,320,233 | 5/1967 | Braun et al. | 260/378 |
| 3,759,958 | 9/1973 | Peter et al. | 260/378 |

OTHER PUBLICATIONS

Dokunikhin et al., J. Gen. Chem., USSR, vol. 27 (1957), pp. 865–867.
Weygand/Hilgetag, Preparative Organic Chemistry, pub. by John Wiley & Sons, New York, pp. 557–560.
Aubrieth et al., The Chemistry of Hydrazine, pub. by John Wiley & Sons, N.Y. (1956), pp. 100–102.

Primary Examiner—Paul M. Coughlan, Jr.
Attorney, Agent, or Firm—Gerald D. Sharkin; Richard E. Vila; Joseph J. Borovian

[57] ABSTRACT

The present invention concerns a novel process for the reduction of a nitro-anthraquinone compound of formula I:

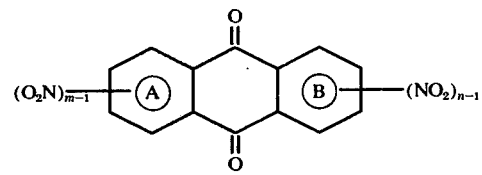

wherein
  $m$ is an integer 1, 2 or 3, and
  $n$ is an integer 1, 2 or 3,
  the sum of $m + n$ being 3, 4 or 5, and the rings A and B are either further substituted or unsubstituted, to the corresponding amino-anthraquinone compound which comprises reacting the compound of formula I with hydrazine in aqueous medium. The resulting amino-anthraquinone compounds are in general known and are useful intermediates in the production of anthraquinone dyestuffs.

4 Claims, No Drawings

PROCESS FOR THE PRODUCTION OF AMINOANTHRAQUINONE COMPOUNDS

The present invention relates to a process for producing amino-anthraquinone compounds.

Accordingly, the present invention provides a process for the reduction of a nitro-anthraquinone compound of formula I:

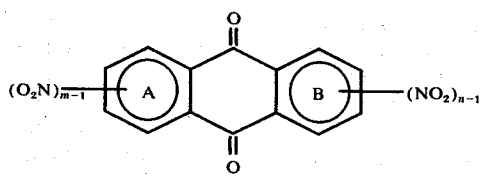

wherein
$m$ is an integer 1, 2 or 3, and
$n$ is an integer 1, 2 or 3,
the sum of $m + n$ being 3, 4 or 5, and the rings A and B are either further substituted or unsubstituted, to the corresponding amino-anthraquinone compounds by reacting the compound of formula I with hydrazine in aqueous medium.

In the compounds of formula I, preferably the or each nitro group occupies an α-position of the anthraquinone nucleus. Preferably also each of $m$ and $n$ is 1 or 2.

As examples of further substituents, which the rings A and B may bear, may be given: hydroxy, optionally substituted alkyl or cycloalkyl, optionally substituted alkoxy, optionally substituted amino, aryl, mercapto, sulpho, carboxy, sulphamoyl, carbamoyl, nitrile, halogen and acyl; each ring has preferably not more than 2 further substituents.

Any alkyl or alkyl containing substituent (e.g. alkoxy, alkylthio, alkyl amino, dialkyl amino) on rings A and B or on a substituent on rings A and B preferably contains 1 to 6, more preferably 1 to 5, e.g. 1 to 4 or 1 to 3, carbon atoms in the alkyl radical.

As examples of alkyl radicals may preferably be given: alkyl radicals of 1 to 6 carbon atoms, e.g. methyl, propyl, ethyl, isopropyl, n-butyl, tert.butyl, n-amyl, isoamyl and n-hexyl. Examples of optionally substituted cycloalkyl radicals are especially: unsubstituted and alkyl-substituted cyclohexyl, e.g. cyclohexyl substituted by methyl and/or ethyl, e.g. cyclohexyl itself, mono-, di- and tri-methyl cyclohexyl or ethyl cyclohexyl. Examples of substituents of the alkyl radicals are: hydroxy, alkoxy, hydroxyalkoxy and phenyl. The alkoxy groups contain, for example, 1 to 4 carbon atoms (methoxy, ethoxy, propoxy, isopropoxy, n-butoxy and tert.butoxy). Where the alkoxy groups are substituted, for example, by hydroxy or alkoxy, they preferably contain 2 or 3 carbon atoms. The alkyl or alkoxy radicals are preferably unsubstituted.

Examples of mercapto radicals are preferably alkylthio groups, the alkyl radicals being those mentioned above.

As aryl radicals may preferably be given carbocyclic aromatic radicals of the phenyl, diphenyl or naphthyl series which may optionally be substituted. As examples of the substituents for the phenyl and diphenyl radicals may be given: hydroxy, alkoxy, alkyl, halogen, the nitro group, the sulphonic acid group, the carboxylic acid group or the corresponding amides of these acids and furthermore, optionally a low-molecular substituted amino group; the alkyl and alkoxy groups may be chosen among those mentioned above. The phenyl radicals are, however, preferably unsubstituted or substituted by 1 or 2 alkyl and/or alkoxy radicals. As examples of substituents of the naphthalene series may be mentioned sulphonic acid groups. If the phenyl radicals, which are present in the molecule, are substituted, they preferably contain 1 to 4 substituents, 1 to 3 substituents selected from the group comprising hydroxy, alkoxy, alkyl and halogen, and/or 1 or 2 substituents selected from the group comprising nitro, carboxy, sulpho, carbamoyl or sulphamoyl, may be present on the same phenyl ring.

The sulphonic acid and carboxylic acid groups in the molecule may be present in the form of free acid groups and in the form of salts. As examples of the salt-forming cation may be given particularly alkali metal and optionally substituted ammonium. The compounds may also be present in the form of alkaline earth metal salts. Examples of alkali metals are lithium, sodium and potassium. As examples of substituted ammonium groups may be given the mono-, di- and tri-alkanolammonium compounds of 2 or 3 carbon atoms in the alkanol radical, particularly triethanol ammonium compounds.

By "halogen" as employed herein is meant fluorine, chlorine, bromine or iodine, chlorine or bromine being preferred.

Acyl preferably signifies alkyl carbonyl, aryl carbonyl or aryl sulphonyl, alkyl and aryl having the above significances.

The hydroxy and/or amino groups, when present as substituents on the rings A and/or B, are preferably present in α-positions unoccupied by nitro-groups and the amino groups may be unsubstituted or substituted. Of the acid or acid derivative groups, which are used as the substituents of the rings A and/or B (sulpho, carboxy, sulphamoyl, cabamoyl, acyl or nitrile), preferably not more than 1 group is present in each of the rings A and B.

The substituted amino groups are, for example, radicals of the following amines: mono- or di-alkyl amines, aryl amines, cycloalkyl amines and N-alkyl-N-aryl amines, the cycloalkyl, alkyl and aryl radicals generally being those of the above-mentioned radicals. Examples of amines are: methylamine, ethylamine, propylamine, butylamine, hexylamine, cyclohexylamine, 3,3,5-trimethylcyclohexylamine, ethylcyclohexylamine, benzylamine, phenylethylamine, monoethanolamine, diethanolamine, dimethylamine, diethylamine, aniline, N-methylaniline, N-ethylaniline, diphenylylamine, toluidine, xylidine, naphthylamine, anisidine, sulphanilic acid, metanilic acid, orthanilic acid, sulphotoluidine, sulphoxylidine and aminonaphthalinic sulphonic acids. Examples of sulphamoyl and carbamoyl groups are unsubstituted amide groups and those which may be derived from the above mentioned substituted amines.

The preferred compounds of formula I are the compounds of formula Ia

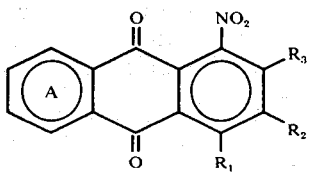

Ia wherein
R₁ signifies hydrogen, hydroxy or

R₂ signifies hydrogen or, when R₁ signifies hydroxy or —NH₂, a sulpho group,

R₃ signifies hydrogen or, when R₂ signifies hydrogen, alkyl of 1 to 6 carbon atoms or carboxy, R' signifies hydrogen, alkyl of 1 to 6 carbon atoms or cyclohexyl unsubstituted or unsubstituted by methyl or ethyl, and R'' signifies hydrogen or alkyl of 1 to 4 carbon atoms, and the ring $A_1$ is unsubstituted in one of the α-positions or bears one nitro, one sulpho group or one halogen, and is unsubstituted in the other α-position or bears one hydroxy or

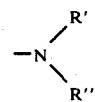

group and the β-positions are unsubstituted or one β-position bears one halogen or one sulpho group. When the ring $A_1$ bears a nitro group, the β-position vicinal to the nitro group is unsubstituted and the ring $A_1$ does not bear more than one sulpho group.

The specially preferred nitroanthraquinone compounds are those of formulae Ib, Ic and Id:

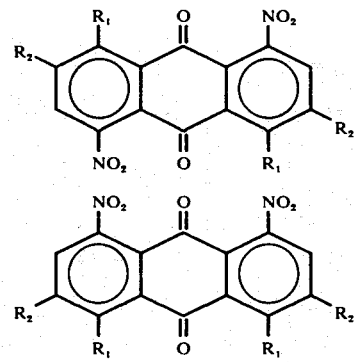

Ib

Ic or

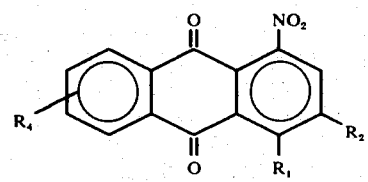

Id wherein
R₄ signifies hydrogen, halogen, sulpho or

in α-position, and
R₁, R₂, R' and R'' are as defined above, or mixtures of those compounds, particularly isomeric mixtures, e.g. of compounds of formulae Ic and Ib.

As specific examples of compounds of formula I may be given: 1,5-dinitro-4,8-dihydroxyanthraquinone, 1,8-dinitro-4,5-dihydroxyanthraquinone and the corresponding sulphonic acids, e.g. 1,5-dinitro-4,8-dihydroxyanthraquinone-3,7-disulphonic acid, 1-amino- or -alkylamino-5-nitroanthraquinone, 1-amino- or -alkylamino-8-nitroanthraquinone, 1,5-dinitro-4,8-diamino- or -dialkylamino-anthraquinone, or the mono- or di-sulphonic acids thereof, unsubstituted 1-nitroanthraquinone, 1,5-dinitroanthraquinone or 1,8-dinitroanthraquinone or the sulphonic acids thereof.

The reduction according to the invention is effected in an aqueous medium which may contain organic solvents. Examples of organic solvents are alcohols (e.g. ethanol, benzyl alcohol), ethers (e.g. dioxane), alcocol ethers (e.g. methyl carbitol, cellosolve, methyl cellosolve), amides (e.g. dimethyl formamide, dimethyl acetamide, hexamethyl phosphoramide), or dimethyl sulphoxide. The reduction is preferably effected by using water alone (as medium). The amount of the medium employed (solvent for the used hydrazine) may vary, but, in any case, good stirrability of the reaction mixture must be ensured. Preferably the amount of aqueous medium employed is between 4 and 50 times, more preferably between 5 and 20 times the weight of the compound of formula I. In molar quantities, the aqueous medium is preferably employed in such an amount that at least 10 mols, more preferably 20 mols e.g. 30, 40 or 50 mols of water are present per mol of the compound of formula I. When the aqueous medium contains an organic solvent, then the medium preferably contain at least 50%, more preferably 60% e.g. 70, 80 or 90%, by weight of water.

The reduction according to the invention may be effected at any temperature which is suitable for the reaction medium and the reactants, preferably from 20° C to the boiling temperature of the reaction medium, optionally under pressure. The preferred temperature is at the boiling temperature of the reaction mixture, e.g. in the range of 50° to 95° C.

The reaction may be effected in acid, neutral or preferably basic medium by simply adding the reaction constituents. The hydrazine may be employed in the form of a free base (preferably as hydrazine hydrate) or in the form of a salt (hydrazine sulphate or hydrazine chlorhydrate), optionally with the addition of alkali, e.g. alkali metal carbonate, -bicarbonate, -acetate or preferably -hydroxide or other stronger bases, e.g. ammonia or mono-, di- or tri-alkanol amine (mono-, di- or tri-ethanol or -isopropanol amine). The hydrazine is preferably employed in an at least stoichiometric amount, i.e. at least 1.5 mol of hydrazine per mol of the nitro group to be reduced. It is advantageous to use an excess of 5 to 10 mols % or even higher e.g. up to 500 or even 1000 mol % excess; the preferred amount is, however 1.5 to 5.0, particularly 2 to 3 mols, of hydrazine per mol of the nitro group to be reduced.

The hydrazine may be added gradually or all at once. If the hydrazine is gradually added, intermediate reduction steps of the nitroanthraquinone employed, e.g. hydroxylaminoanthraquinone, may be isolated. The nitroanthraquinone used is preferably reacted directly to the amino step. The resulting amino compound may be isolated from the reaction mixture by methods known per se.

The compounds of formula I and the resulting amino compounds produced in accordance with the process of the invention are, in general, known. Moreover, the resulting known amino compounds are well known to be useful as intermediates for the production of known anthraquinone dyes. Insofar as a resulting amino compound is not known, it may be used in analogous manner to the known compounds for the production of useful aminoanthraquinone dyes which dyes may be used in analogous manner to the known dyes. The obtained amino products may be used directly for the production of dyes without additional purification processes.

In the following Examples the parts and percentages are by weight and the temperatures in degrees centigrade.

EXAMPLE 1

500 Parts of water, 20 parts of hydrazine hydrate and 100 parts of 30% sodium hydroxide solution are heated to 70°. 51 Parts of 1-nitro-anthraquinone are entered over the course of 1 hour. The temperature of the reaction mixture is kept at between 70° and 75°. After the addition of the whole amount of 1-nitroanthraquinone, the suspension is heated to 80° and stirred for 1 hour. 70 Parts of 40% sodium hydroxide solution are subsequently added. The reaction mass is then stirred at 90° over the course of 90 minutes and filtered. The precipitate is washed with water until the filtrate is colourless and neutral, and then dried. 43 Parts of 1-amino-anthraquinone are obtained.

EXAMPLE 2

A mixture consisting of 12 parts of hydrazine hydrate and 140 parts of water is heated to 70° and 25 parts of 1,5-dinitro-4,8-dihydroxy-anthraquinone-3,7-disulphonic acid in the form of approximately 60 parts of moist acid suction product is regularly added over the course of 1 hour. The temperature of the suspension is kept at between 70° and 75°. After the addition of the whole amount of 1,5-dinitro-4,8-dihydroxy-anthraquinone-3,7-disulphonic acid, the reaction mass is stirred at 75° over the course of 30 minutes and then filtered. The precipitate is washed with 10% aqueous sodium sulphate solution until the filtrate is virtually colourless, and then dried. The dried precipitate is allowed to stand in the open air for 48 hours until the weight is constant. 28 Parts of 1,5-diamino-4,8-dihydroxyanthraquinone-2,7-disulphonic acid, containing 80% of free acid of 100% dihydrate, are obtained.

EXAMPLE 3

A technical mixture of 15 parts of 1-methylamino-5-nitro-anthraquinone and 13 parts of 1-methylamino-8-nitro-anthraquinone, 250 parts of water, 20 parts of hydrazine hydrate and 40 parts of 30% sodium hydroxide solution is stirred in the cold. The suspension is heated to 90° over the course of 1 hour and stirred at 90°–95° over the course of 90 minutes. The pH of the suspension is then adjusted to 5 with approximately 100 parts of 40% acetic acid. The suspension is filtered. The precipitate is washed with hot water until the filtrate is colourless and neutral, and then dried. 24 Parts of a technical mixture of 1-amino-5-methylaminoanthraquinone and 1-amino-8-methylamino-anthraquinone are obtained.

EXAMPLE 4

28 Parts of 1-nitro-6-chloro-anthraquinone are entered over the course of 1 hour into a mixture at 70° consisting of 250 parts of water, 10 parts of hydrazine hydrate and 67 parts of 30% aqueous sodium hydroxide solution. The reaction mixture is subsequently stirred at 70° over the course of 2 hours and then cooled to 25°. The precipitate is suction filtered, washed with water until the filtrate is neutral, and dried. 25 Parts of 1-amino-6-chloro-anthraquinone, having a M.P. of 207°–211°, are obtained.

EXAMPLE 5

28 Parts of 1-nitro-5-chloro-anthraquinone are entered with stirring over the course of 1 hour into a mixture of at 70° consisting of 250 parts of water, 10 parts of hydrazine hydrate, 67 parts of 30% aqueous sodium hydroxide solution and 50 parts of dioxane. The reaction mass is stirred at 70° over the course of 30 minutes and then cooled to 25°. The precipitate is suction filtered, washed with water until the filtrate is neutral, and then dried. 25 Parts of 1-amino-5-chloro-anthraquinone, having a M.P. of 203°–205°, are obtained.

EXAMPLE 6

28 Parts of 1-nitro-7-chloro-anthraquinone are entered with stirring over the course of 1 hour at 70° into a mixture consisting of 250 parts of water, 10 parts of hydrazine hydrate and 67 parts of 30% aqueous sodium hydroxide solution. The reaction mass is stirred at 70° over the course of 45 minutes, cooled to 25° and poured into 1000 parts of water. The suspension is acidified with aqueous hydrochloric acid. The precipitate is suction filtered, washed with water until the filtrate is colourless and neutral, and then dried. 25 Parts of 1-amino-7-chloro-anthraquinone, having a M.P. of 225°–227°, are obtained.

EXAMPLE 7

30 Parts of 1-nitro-anthraquinone-2-carboxylic acid are entered with stirring over the course of 1 hour into a mixture at 70° consisting of 250 parts of water, 10 parts of hydrazine hydrate and 67 parts of aqueous sodium hydroxide solution (30%). The reaction mass is heated to 80° and stirred at 80° over the course of 4 hours. It is subsequently diluted with 250 parts of water and filtered. The precipitate is stirred into 1000 parts of water and acidified with aqueous hydrochloric acid. The precipitate is filtered off, washed with water until the filtrate is colourless and neutral, and then dried. 20 Parts of 1-amino-anthraquinone-2-carboxylic acid are obtained.

EXAMPLE 8

33 Parts of 1-nitro-anthraquinone-5-sulphonic acid are entered with stirring over the course of 1 hour into a mixture consisting of 250 parts of water, 10 parts of hydrazine hydrate and 67 parts of 30% aqueous sodium hydroxide solution. The reaction solution is stirred at 70° over the course of 2 hours, cooled to 25° and poured into 1000 parts of water. The precipitate is suction filtered, washed with 2000 parts of aqueous sodium chloride solution (10%) until the filtrate is neutral, and then dried. 34 Parts of 1-anthraquinone-5-sulphonic acid, which contains 5 parts of sodium chloride, are obtained.

EXAMPLE 9

27 Parts of 1-nitro-2-methyl-anthraquinone are entered with stirring at 70° over the course of 2 hours, into a mixture consisting of 250 parts of water, 10 parts of hydrazine hydrate and 67 parts of 30% aqueous sodium hydroxide solution. The reaction mass is stirred at 70° over the course of 3 hours. The precipitate is filtered, washed with water until the filtrate is colourless and neutral, and then dried. 16 Parts of 1-amino-2-methyl-anthraquinone, having a M.P. of 195°–197°, are obtained.

EXAMPLE 10

14 Parts of 1-amino-4-nitro-anthraquinone, 100 parts of dimethyl sulphoxide, 100 parts of water and 7 parts of hydrazine hydrate are mixed and stirred at 40°. The mixture is gradually heated to 60° over the course of 50 minutes. The pH of the reaction mass is subsequently adjusted to 9–10 by the addition of 2.7 parts of 30% aqueous sodium hydroxide solution. The reaction mass is subsequently stirred at 70° over the course of 4 hours until no starting material can be detected according to chromatography. The reaction mass is poured into 800 parts of water. The precipitate is filtered off, washed with water until the filtrate is neutral and colourless, and then dried. 11 Parts of 1,4-diamino-anthraquinone, having a M.P. of 258°–260°, are obtained.

EXAMPLE 11

140 Parts of 1,5-dihydroxy-4,8-dinitro-anthraquinone-2,6-disulphonic acid in the form of 270 parts of an aqueous paste, containing sulphuric acid and sodium bisulphate and obtained by sulphonation and nitration of 81 parts of 1,5-dihydroxy-anthraquinone, are entered with stirring at 40° into 700 parts of water. 60 Parts of hydrazine hydrate are then added dropwise over the course of 90 minutes. The pH of the reaction mass immediately rises from 1,7 to 4 and then to 6.5. This value is kept by the dropwise addition of 45 parts of 30% aqueous hydrochloric acid. The temperature of the reaction mass is then raised to 80°. 10 Parts of hydrazine hydrate are then added dropwise over the course of 10 minutes. The pH is kept at 5.8 to 6 by the addition of 20 parts of 30% aqueous hydrochloric acid. The mass is stirred at 80° for 10 minutes. 58 Parts of 30% aqueous sodium hydroxide solution are subsequently added dropwise over the course of 5 minutes, whereby the pH is adjusted to 8. The precipitate is suction filtered, washed with 2000 parts of aqueous 10% sodium sulphate solution and 5000 parts of aqueous 5% sodium sulphate solution, and dried at 120°. 129 Parts of 1,5-dihydroxy-4,8-diamino-anthraquinone-2,6-disulphonic acid, containing 80% of free disulphonic acid, are obtained.

What is claimed is:

1. In a process for the reduction of a nitroanthraquinone compound of formula I:

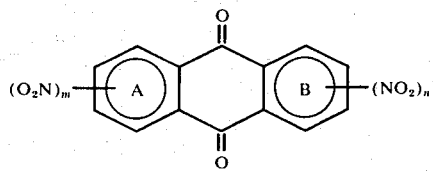

wherein
 $m$ is 0, 1 or 2,
 $n$ is 0, 1 or 2,
 the sum of $m + n$ being 1, 2 or 3, and the rings A and B are either unsubstituted or further substituted in any position unoccupied by a nitro group by hydroxy, alkyl ($C_1$–$C_6$), hydroxyalkyl ($C_1$–$C_6$), alkoxy ($C_1$–$C_4$) alkyl ($C_1$–$C_6$), hydroxyalkoxy ($C_1$–$C_4$) alkyl ($C_1$–$C_6$), phenylalkyl ($C_1$–$C_6$), cycloalkyl ($C_5$–$C_{12}$), alkyl ($C_1$–$C_6$) cycloalkyl ($C_5$–$C_{12}$), alkoxy ($C_1$–$C_4$), hydroxyalkoxy ($C_2$–$C_3$), alkoxy ($C_1$–$C_4$) alkoxy ($C_2$–$C_3$), amino, monoalkyl ($C_1$–$C_6$) amino, dialkyl ($C_1$–$C_6$) amino, arylamino, cycloalkyl ($C_5$–$C_{12}$) amino, alkyl ($C_1$–$C_6$) cycloalkyl ($C_5$–$C_{12}$) amino, N-alkyl ($C_1$–$C_6$)-N-cycloalkyl ($C_5$–$C_{12}$) amino, N-alkyl ($C_1$–$C_6$) alkyl ($C_1$–$C_6$)-N-cycloalkyl-($C_5$–$C_{12}$) amino, N-alkyl ($C_1$–$C_6$)-N-arylamino, aryl, alkyl ($C_1$–$C_6$) thio, sulpho, carboxy, sulphamoyl, carbamoyl, nitrile, halo, alkyl ($C_1$–$C_6$) carbonyl, arylcarbonyl or arylsulphonyl, wherein each aryl, aryl of arylamino, aryl of N-alkyl ($C_1$–$C_6$)-N-arylamino, aryl of arylcarbonyl and aryl of arylsulphonyl is, independently, selected from phenyl, diphenyl, substituted phenyl or diphenyl wherein the substituents of substituted phenyl or diphenyl are, independently, hydroxy, alkoxy ($C_1$–$C_6$), alkyl ($C_1$–$C_6$), halo, nitro, sulpho, carboxy, amino, monoalkyl ($C_1$–$C_6$) amino, carbamoyl and sulphamoyl, naphthyl and sulphosubstituted naphthyl, to the corresponding amino-anthraquinone compound, the improvement consisting of reacting a compound of formula I with hydrazine in an aqueous medium, wherein the aqueous medium comprises from 50 to 100% by weight of water and wherein at least 10 mols of water are present in the aqueous medium per mol of the nitroanthraquinone compound.

2. A process according to claim 1 for the reduction of a nitroanthraquinone compound of the formula

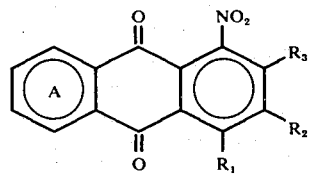

wherein
 $R_1$ is hydrogen, hydroxy or

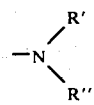

wherein

R' is alkyl (C$_1$–C$_6$), cyclohexyl or cyclohexyl substituted by methyl or ethyl and R" is hydrogen or alkyl (C$_1$–C$_4$), R$_2$ is hydrogen or a sulpho group, with the proviso that R$_2$, is a sulpho group only when R$_1$ is hydroxy or —NH$_2$ R$_3$ is hydrogen, alkyl (C$_1$–C$_6$) or carboxy, with the proviso that R$_3$ is alkyl (C$_1$–C$_6$) or carboxy only when R$_2$ is hydrogen, and ring A, is unsubstituted in one of the α positions or bears a nitro, sulpho or halogen substituent, and is unsubstituted in the other α-position or bears a hydroxy or

substituent wherein

R' and R" are as defined above, and is unsubstituted in one β position and the other β-position bears a halogen or sulpho substituent, with the proviso that when ring A bears a nitro group, the β position vicinal to the nitro group is unsubstituted and ring A bears no more than one sulpho substituent.

3. A process according to claim 2, for the reduction of a compound of the formulae:

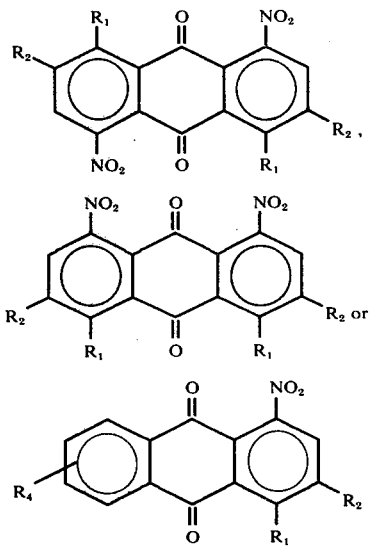

wherein

R$_4$ occupies an α position and is hydrogen, halogen, sulpho or

wherein R$_1$, R$_2$, R' and R" are as defined in claim 2, or mixtures of such compounds.

4. A process according to claim 1, wherein the amount of aqueous medium employed is between 4 and 50 times the weight of the nitro-anthraquinone compound.

* * * * *